United States Patent
Dang et al.

(10) Patent No.: US 6,947,243 B2
(45) Date of Patent: Sep. 20, 2005

(54) METHOD AND SYSTEM FOR TIME-SHIFT BASED ROTATIONAL VIBRATION SENSING IN DISK DRIVES

(75) Inventors: Hien Dang, Nanuet, NY (US); Isao Yoneda, Yokohama (JP); Tetsuo Ueda, Sagamihara (JP); Yuzo Nakagawa, Hiratsuka (JP); Sri M. Sri-Jayantha, Ossining, NY (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 221 days.

(21) Appl. No.: 10/153,683

(22) Filed: May 24, 2002

(65) Prior Publication Data

US 2003/0218823 A1 Nov. 27, 2003

(51) Int. Cl.$^7$ ................................ G11B 5/596
(52) U.S. Cl. ................ 360/75; 51/77.08; 51/78.14; 51/78.11
(58) Field of Search ............... 360/73.03, 73.02, 360/73.01, 75, 51, 77.08, 78.14, 78.11, 77.02, 77.03, 77.04, 55, 60, 77.14, 25; 318/60, 63; 714/48, 25; 700/280

(56) References Cited

U.S. PATENT DOCUMENTS

| | | | |
|---|---|---|---|
| 5,400,196 A | 3/1995 | Moser et al. |
| 5,426,545 A | 6/1995 | Sidman et al. |
| 5,608,586 A | 3/1997 | Sri-Jayantha et al. |
| 5,721,457 A | 2/1998 | Sri-Jayantha et al. |
| 6,088,185 A | 7/2000 | Ratliff et al. |
| 6,122,139 A | 9/2000 | Sri-Jayantha et al. |

FOREIGN PATENT DOCUMENTS

JP 2565637 10/1996

OTHER PUBLICATIONS

Jinzenji et al., "Acceleration Feedforward Control Against Rotational Disturbance In Hard Disk Drives", IEEE 2001, Nov. 22, 2000, 6 Pages Total.

*Primary Examiner*—David Hudspeth
*Assistant Examiner*—Natalia Figueroa
(74) *Attorney, Agent, or Firm*—Sean M. McGinn; Lewis L. Nunnelley

(57) ABSTRACT

A method (and structure) senses a rotational vibration of a disk drive. The disk drive includes a rotating disk. The disk includes a plurality of reference bits across a surface thereof. The method (and structure) includes detecting the reference bits across a pattern on the rotating disk, and analyzing a time interval between adjacent ones of the reference bits.

14 Claims, 19 Drawing Sheets

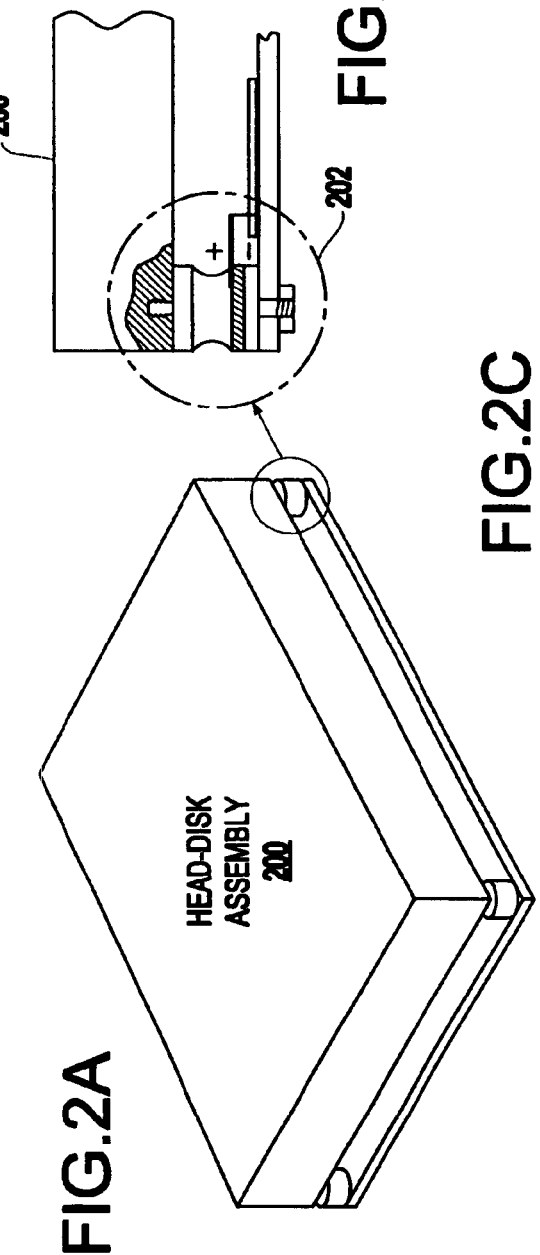
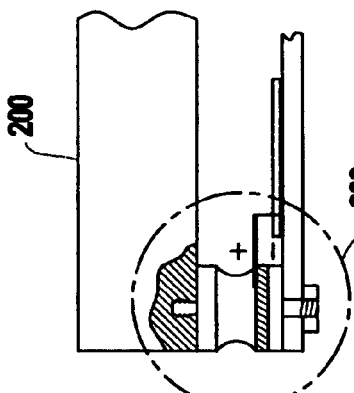
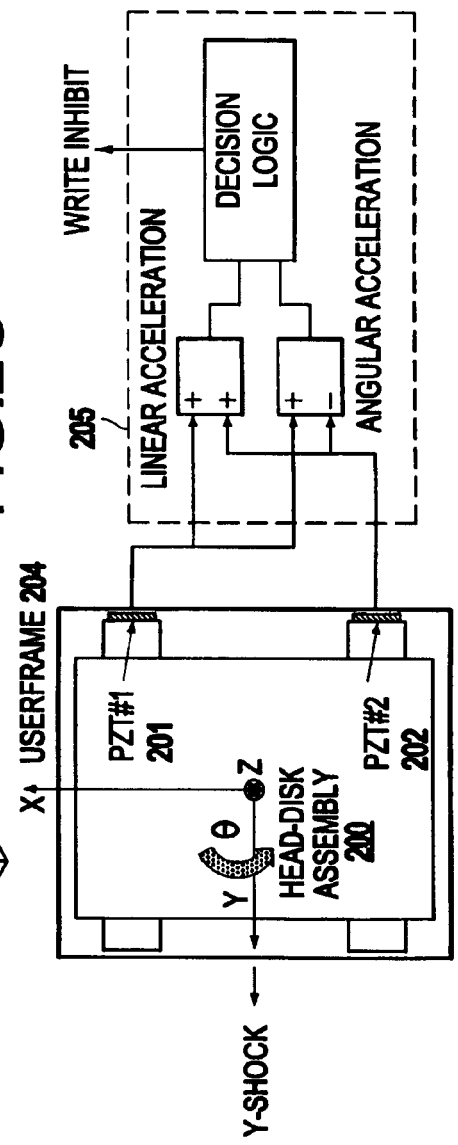
FIG.2A
FIG.2B
FIG.2C

PHASE=LAG
ROTATIONAL VIBRATION DIRECTION

REFERENCE POSITION

PHASE=LEAD
ROTATIONAL VIBRATION DIRECTION

FIG.6D

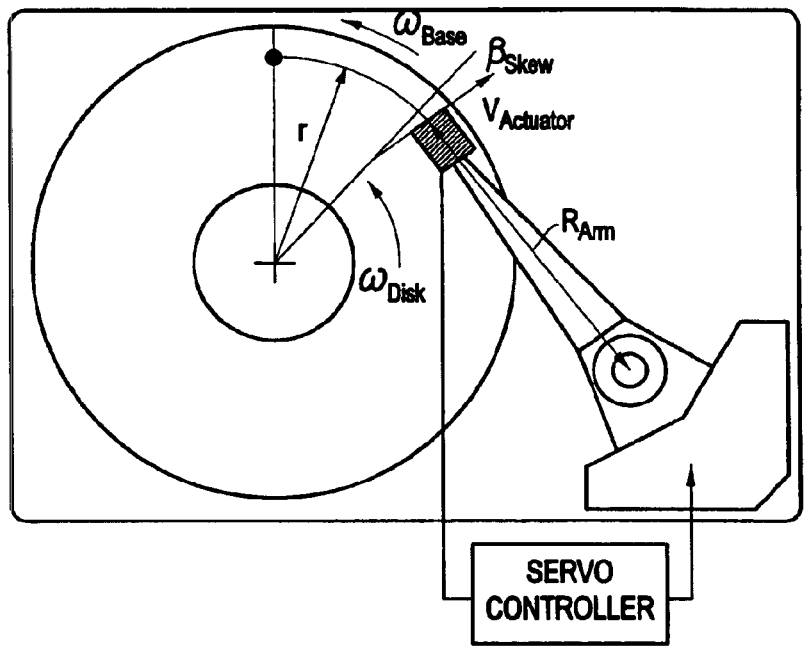

$L = T_{Nominal} \, r\omega_{Disk} = T_{AB} \, (r\omega_{Disk} - r\omega_{Ave\text{-}Base} + V_{Actuator} \, \text{Sin}(\beta_{Skew}))$ where  $V_{Actuator} = R_{Arm} \, \omega_{Ave\text{-}Base} \, (G/(1+G))$ $T_{Nominal}\omega_{Disk} = T_{AB} \, (\omega_{Disk} - \underbrace{\omega_{Ave\text{-}Base} \, (1 - (R_{Arm}/r)(G/(1+G)) \, \text{Sin}(\beta_{Skew}))})$ $T_{Nominal} \, \omega_{Disk} = T_{AB}(\omega_{Disk} - \lambda\omega_{Ave\text{-}Base})$ Timing Jitter $= (T_{AB} - T_{Nominal}) = T_{Nominal} \, (\lambda\omega_{Ave\text{-}Base} / \omega_{Disk})$

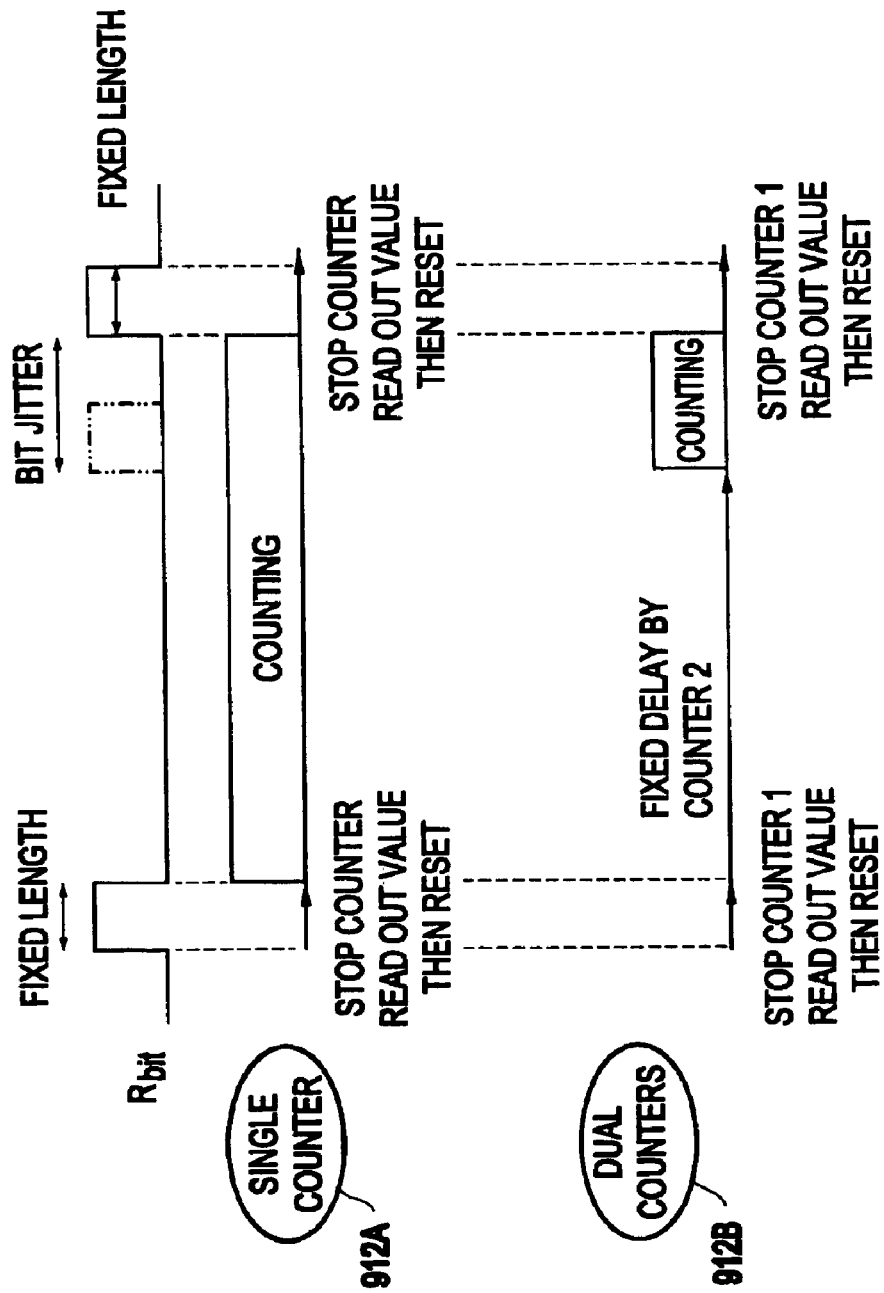

METHOD AND SYSTEM FOR TIME-SHIFT BASED ROTATIONAL VIBRATION SENSING IN DISK DRIVES

BACKGROUND OF THE INVENTION

1. Field of the Invention

The present invention generally relates to a disk drive, and more particularly to a method and system for detecting rotational vibration without using an external sensor, and more particularly by measuring the time shift of the magnetic transitions (e.g., time variations or jitters, or bit variations or jitters) due to vibration alone.

2. Description of the Related Art

As track density continues to grow, vibration induced track following error component becomes highly critical to the operation of a disk drive. The effective data rate throughput is degraded in the presence of rotational vibration. At high TPI (tracks per inch), the in-plane rotational vibration (theta coordinate) of a disk drive, directly impacts the TMR (track misregistration) component. A solution to this vibration challenge can be developed along several disciplines, ranging from novel mount systems to sophisticated sensors and servo algorithms.

A computer system may include one or more disk drives where each drive contributes to the total vibration environment. In addition, a computer system itself may be subjected to external seismic excitations. Head positioning accuracy in a disk drive is prone to both self-generated vibration and to vibration generated by a neighboring disk drive or other peripherals attached to the same mounting structure.

The present generation of 1.0", 2.5" and 3.5" hard disk drives (HDDs) are designed to operate in portable and desk-top/server environments respectively. To reduce cost and weight of a computer system, manufacturers tend to fabricate the hard disk drive (HDD) mounting frame utilizing thin structural members. Therefore, a computer frame is a compliant object which makes it susceptible to vibration.

Such a mounting configuration makes a disk drive vulnerable to vibration excited by internal and external sources. An HDD with a rotary actuator system is highly sensitive to in-plane rotational vibration (RV) of its base plate.

As known, a head positioning servo system in an HDD performs three critical tasks. First, it moves the head to the vicinity of a target in a minimum time using a velocity servo under a seek mode. Next, it positions the head on the target track with a minimum settle-out time using a position controller without an integrating term in it. Finally, the servo system enters the track follow mode with a proportional-integral-derivative type (PID) position controller.

During the seek mode, maximum rotational acceleration torque followed by a deceleration torque is imparted by a voice coil motor (VCM)-based actuator. The corresponding reaction torque on the base-plate causes transient rotational vibration that can be detrimental to the positioning accuracy of the read/write heads.

However, the presence of random vibration impacts the track following precision, and to a lesser degree the settle-out performance. This problem has been recognized by the present inventors and the present inventors hereinbelow address the problem of random vibration as it critically affects the track following precision of an HDD actuator system.

Present 3.5" disk drives have reached 40 kTPI, and in the future it is expected to grow beyond 50 kTPI. A major obstacle to raising the track density is inadequate head positioning accuracy in the presence of vibration disturbances. Due to exponential growth in TPI, positioning the read/write elements over a track has become a major challenge. Conventional servo control system requires continuous innovations to perform well under increasingly difficult operating conditions.

The mechanical components such as spindle motor assemblies are not perfectly mass-balanced, and during operation they produce harmonic vibration. Harmonic vibration produces both a linear and a rotational oscillatory motion of the entire HDD system. When not compensated, a track following error of 15% of the track pitch can be detrimental to a disk drive's "soft" and "hard" error rate performance. The positioning error due to this internally produced periodic vibration can be solved using a servo method proposed in U.S. Pat. No. 5,608,586, incorporated herein by reference.

By using special shock and vibration isolation mount design, the rotational oscillatory components due to internal spindle forcing can be minimized as taught by U.S. Pat. No. 5,400,196, incorporated herein by reference. However, a mount design optimized to decouple internal spindle vibration as covered by the U.S. Pat. No. 5,400,196, remains susceptible to external input vibration.

By deploying the isolation mounts along a polygon satisfying a particular set of criteria defined by Japan Patent No. 2,565,637, the external vibration inputs generating rotational vibration on an HDD can be minimized.

In U.S. Pat. No. 6,122,139, incorporated herein by reference, a method to neutralize the reaction by generating a counter torque using a secondary actuator is disclosed. An HDD with a novel sensing and control solution could provide an enhancement to the problem of random vibration.

By deploying dual PZT sensors 101, 102, as shown in FIG. 1, and a signal conditioning algorithm, a conventional system 100 (e.g., see A. Jinzenji et al. "Acceleration feedforward control against rotational disturbance in hard disk drives," APMRC-Nov. 6–8 2000, TA6-01-TA6-02) demonstrates a feedforward solution to random vibration. PZT sensors 101, 102 by themselves do not produce high quality output without additional innovation. FIG. 1 also illustrates a feedforward compensator 103, a conventional servo 104, a base plate 105, a head 106, a disk 107, and an actuator 108 for the head 106.

As shown in FIGS. 2A–2C, U.S. Pat. No. 5,721,457, incorporated herein by reference, shows a dual PZT configuration 201, 202 in a disk drive where the mass and inertia of the disk drive is exploited as the seismic body to measure angular and linear acceleration with substantial sensitivity.

That is, FIG. 2(a) illustrates a head disk assembly 200, FIG. 2(b) illustrates in greater detail the piezoelectric strain sensor 201, 202 for measuring acceleration, and FIG. 2(c) illustrates the head disk assembly 200 on a userframe 204 undergoing shock and vibration, with the dual PZTs 201, 202 providing an angular and linear acceleration inputs to a component 205, thereby resulting in a write inhibit signal being issued.

Another challenge in the use of PZTs is that they are sensitive to strain along multiple axes, and therefore they respond to vibration inputs in addition to the theta-dynamics.

To produce high fidelity signals in the range of 100–1000 Hz, the size of a PZT configuration must be large and such a design is not compatible with the electrical card height and manufacturing requirements in a disk drive.

On the other hand, reducing the PZT volume produces poor signal quality, and more particularly the signal drift in the low frequency range (~100 Hz) is not easily stabilized. Signal stability and noise are key problems in employing a compact PZT configuration. Sudden drift in PZT signal can cause undesirable write-abort condition.

Use of dual PZTs further complicates the problem of matching the individual PZT gain and thermal sensitivity. With novel mechanical structures, the sensitivity of a PZT can be enhanced along the desired direction and minimized along the remaining directions. However, this requirement makes the sensor cost prohibitive for a disk drive application.

As an alternative approach using a capacitive sensing micromechanical device, C. Hernden, "Vibration cancellation using rotational accelerometer feed forward in HDDs," Data Storage, November, 2000, pp. 22–28, attempts to produce a quality theta-acceleration sensor. Sensor size, bandwidth and cost are considered to be a limitation of a micro-electromechanical structures (MEMS) sensor.

Thus, prior to the present invention, there have been no optimized methods or structures for reducing the rotational vibration of the disk drive, in the plane of the rotary actuator which causes higher steady-state tracking error due to the finite bandwidth and gain of the servo position controller.

That is, the conventional techniques of using sensors such as dual piezoelectric (PZT) or electromotive force generator (EMF) to allow the servo position controller to compensate for this type of disturbance, have not been adequate or optimized. Indeed, such techniques have required an external sensor to detect the rotational vibration, thereby making the HDD costly and complex, and there has been no scalability with the expected future increase in tracks per inch (TPI) and bits per inch (BPI).

SUMMARY OF THE INVENTION

In view of the foregoing and other problems, drawbacks, and disadvantages of the conventional methods and structures, an object of the present invention is to provide a method and structure for optimally reducing and compensating for the rotational vibration of the disk drive.

Another object of the invention is to provide an optimized method and structure for compensating for rotational vibration, without using an external sensor for detecting the rotational vibration.

Yet another object of the invention is to provide an optimized method and structure for compensating for rotational vibration, which is less costly and more compact, as compared to the conventional structures and methods.

A further object is to provide a method and structure in which scalability is provided to accommodate the expected future increase in tracks per inch (TPI) and bits per inch (BPI).

A still further object is to compensate for rotational vibration about a Z-axis (e.g., so-called theta-dynamics) of a base plate of an HDD, and to minimize track misregistration (TMR) error produced by theta-dynamics by an algorithm to detect the rotational velocity without using an external sensor.

In a first aspect of the present invention, a method (and system) for sensing a rotational vibration of a disk drive, the disk drive including a rotating disk and the rotating disk including a plurality of reference bits across a surface thereof, the method (and structure) including detecting the reference bits across a pattern on the rotating disk, and analyzing a time interval between adjacent ones of the reference bits.

With the unique and unobvious aspects of the invention, rotational vibration of the disk drive, in the plane of the rotary actuator causes higher steady-state tracking error due to the finite bandwidth and gain of the servo position controller.

Thus, unlike the conventional arrangements, including dual piezoelectric (PZT) or electromotive force generator (EMF) sensors to allow the servo position controller to compensate for this type of disturbance, the invention detects the rotational vibration without using any external sensor.

That is, the invention achieves the above and other objects by measuring the time shift of the magnetic transitions (e.g., time jitters or bit jitters) due to vibration alone. The invention can advantageously use digital electronics (e.g., either alone or if desired with analog components; preferably only digital electronics are used). Thus, the digital electronics can be integrated with other VLSI at substantially lower cost and lower complexity than other vibration detectors currently used.

Further, since the existing servo pattern is used, this low cost sensing method automatically scales with future increase in TPI and BPI.

Additionally, with multiple heads provided, there are many opportunities to detect/sense the motion, and thereby redundancy is provided. Additionally, if only one head is active at a time, then that particular head's vibration detection could be used. It is possible that, now with "n" heads (sensors), redundancy is provided since if one of the heads becomes inoperable, then there still would be "n−1" heads available.

BRIEF DESCRIPTION OF THE DRAWINGS

The foregoing and other purposes, aspects and advantages will be better understood from the following detailed description of a preferred embodiment of the invention with reference to the drawings, in which:

FIGS. 2A–2C illustrate the use of dual sensors to detect angular acceleration according to the conventional arrangement;

FIGS. 6A–6D illustrate a relationship between the bit jitter (time shift) and angular vibration;

FIG. 9 illustrates methods to measure T(n);

DETAILED DESCRIPTION OF PREFERRED EMBODIMENTS OF THE INVENTION

Figure 1:
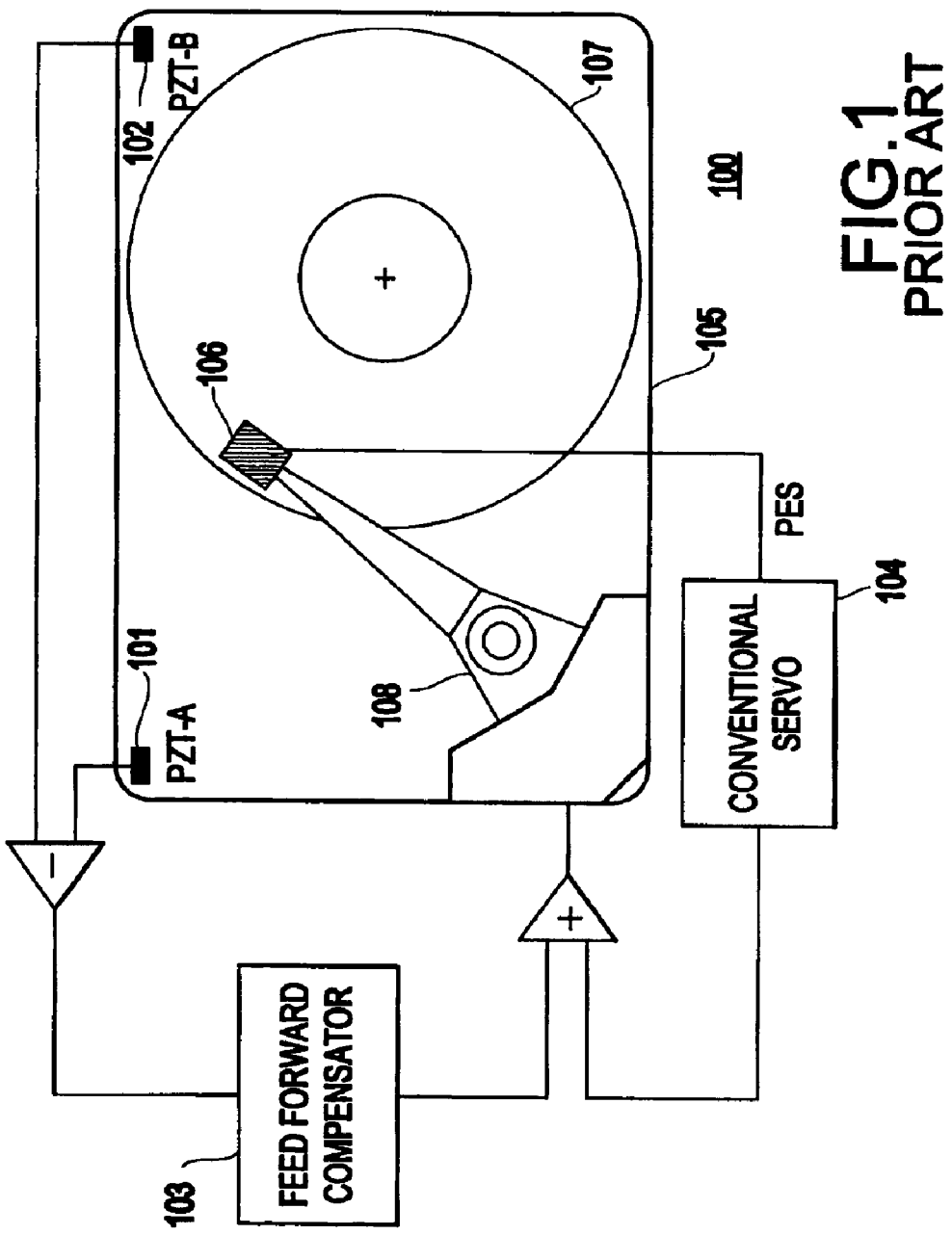
FIG. 1 illustrates an acceleration feed forward control using PZT sensors 101, 102 according to the conventional arrangement.
Figure 3:
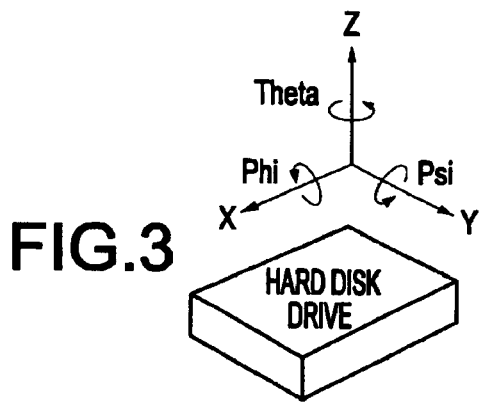
FIG. 3 illustrates linear and angular coordinates.

Referring now to the drawings, and more particularly to FIGS. 3–18, there are shown preferred embodiments of the method and structures according to the present invention.
Preferred Embodiment As shown in FIG. 3, an actuator of a disk drive generates a reaction torque during a seek. In computer configurations where there are multiple drives arranged in the form of an array, the multiple reactions produced by the drives generate a vibration spectrum. The form and magnitude of a vibration (e.g., both linear and rotational) spectrum is system specific, but it tends to be a band-limited power spectrum interspersed with a finite number of harmonics.

As shown in FIG. 3, the base-plate vibration, especially along X, Y and about Z axes can contribute to TMR. A major contribution to TMR comes from rotational vibration about the Z axis (e.g., so-called theta-dynamics). The actuator mass imbalance contributes to TMR through the torque disturbance produced by the linear vibration of the actuator pivot, but nominally the imbalance amount is negligible.

The present invention strives to minimize the TMR error produced by theta-dynamics by an algorithm to detect the rotational velocity without using an external sensor, as in the conventional systems.

Figure 4A:
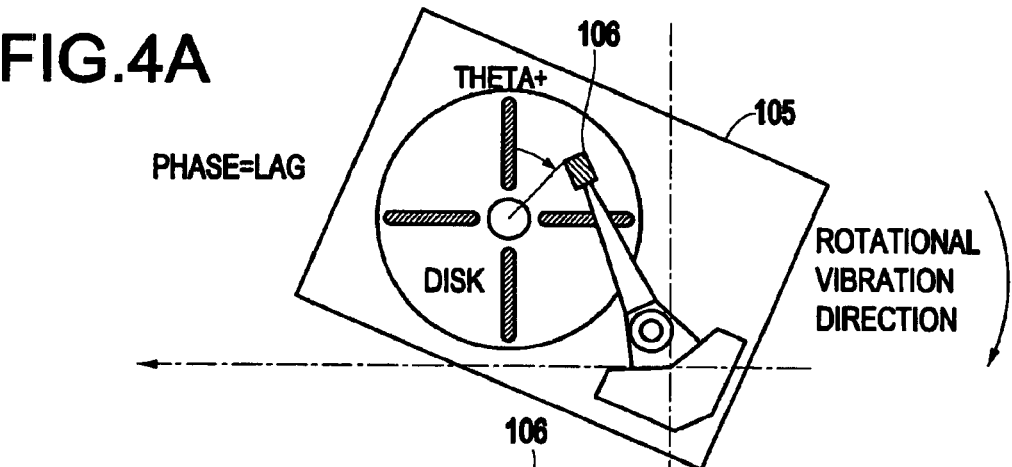
FIGS. 4A–4C illustrate an angular vibration applied to a stationary disk.
Figure 4B:
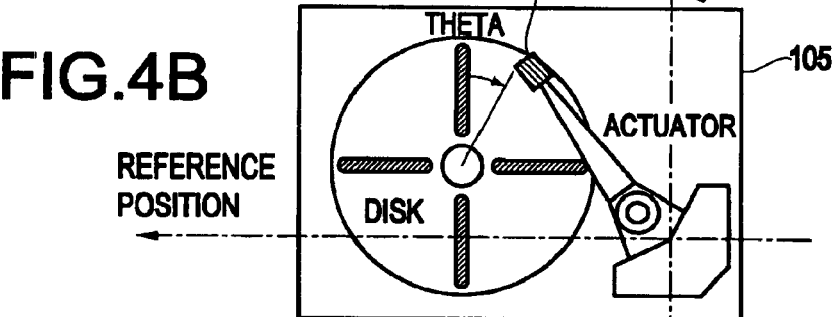
Figure 4C:
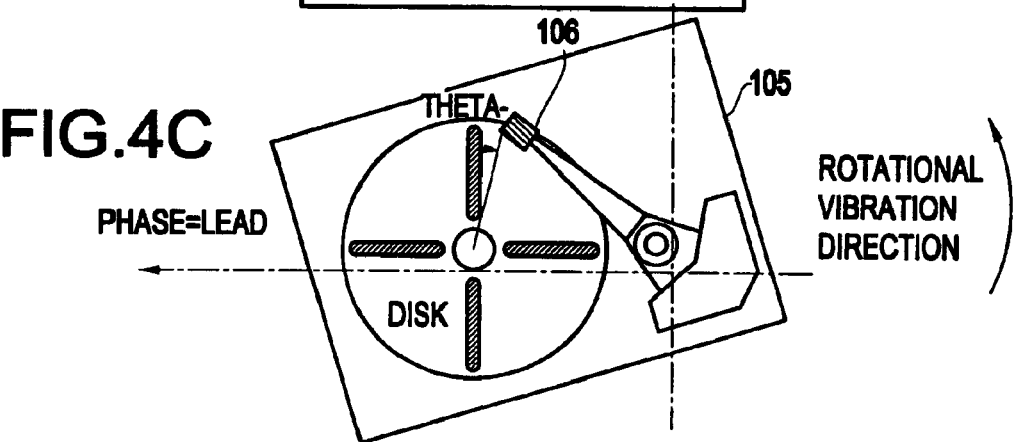

FIGS. 4A–4C illustrate that even while the spindle is not rotating, the base plate 105 may be subjected to rotational vibration (RV).

FIG. 4B shows the reference position in which the base plate 105 is parallel to the X axis and the head 106 is at an angle θ (theta) from the Y axis.

Thus, if a rotation vibration is applied to the base plate 105 and the base plate 105 is rotated clockwise about the pivot of the actuator (e.g., as shown in FIG. 4A), then the head 106 will be at an angle Theta+ (plus) which is larger than before.

Conversely, if a rotational vibration is applied to the base plate, and the base plate 105 is rotated counterclockwise (e.g., as shown in FIG. 4C), then the head 106 will be at a smaller angle Theta– (minus).

Figure 5A:
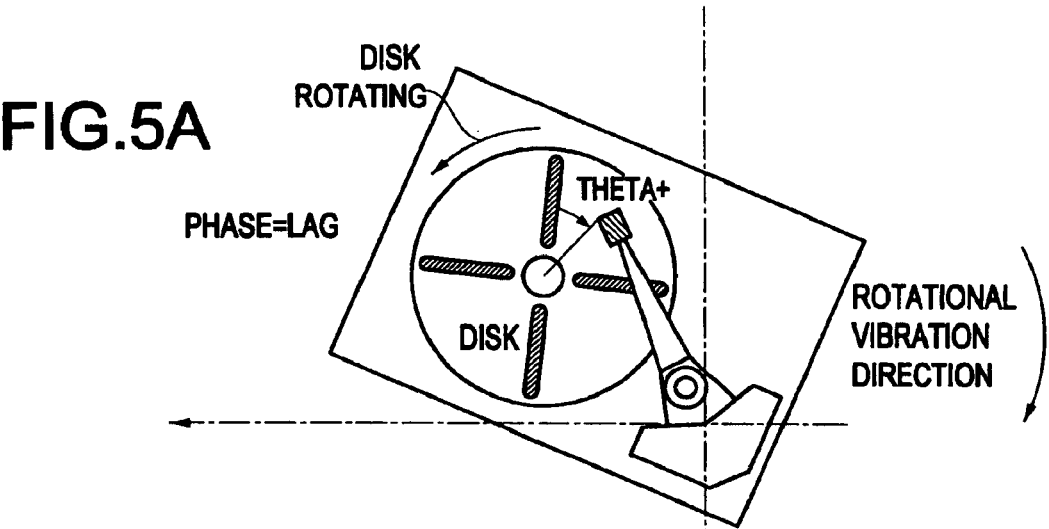
FIGS. 5A–5C illustrate an angular vibration applied to a rotating disk.
Figure 5B:
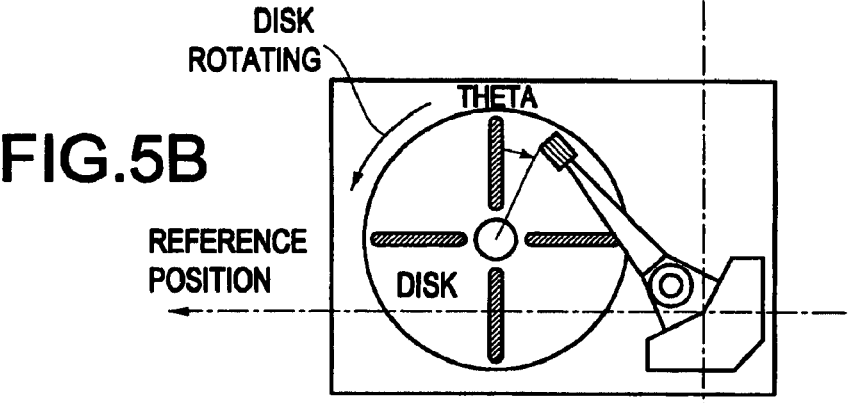
Figure 5C:
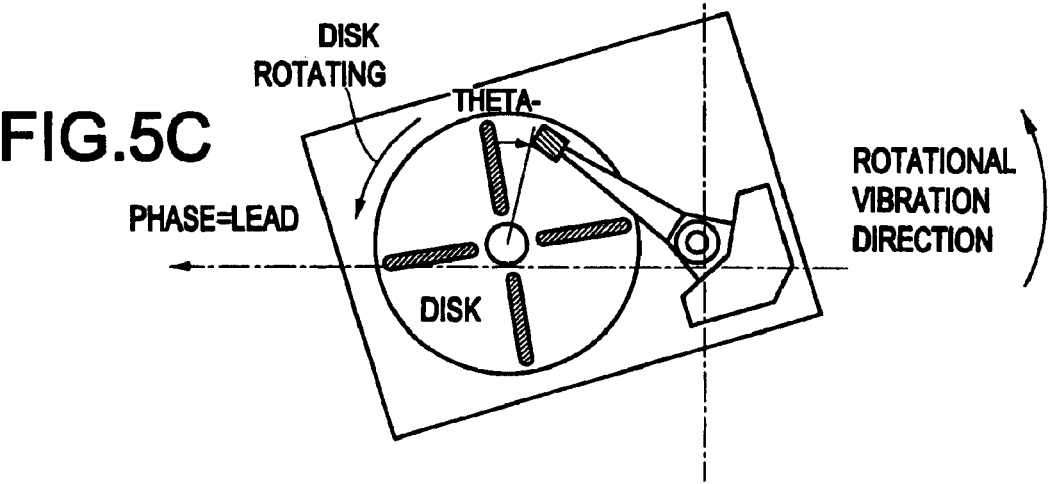

If the disk is rotating, then information will arrive at the head 106 later for a clockwise rotation (e.g., as shown in FIG. 5A) and sooner for a counterclockwise rotation.

Figure 6A:
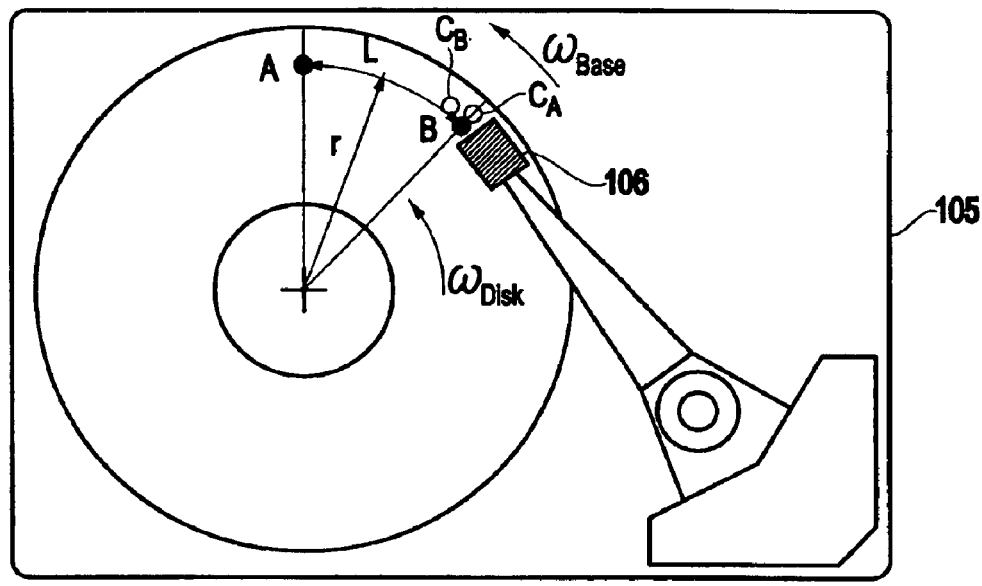

FIG. 6A shows points A and B, located on the disk surface, at a radius r from the disk center and separated by an arc length L. Point $C_A$ and $C_B$ are the projections of points A and B on to the base plate which is rotating at an angular velocity $\omega_{Base}$. The disk is rotating at angular velocity $\omega_{Disk}$.

Figure 6B:
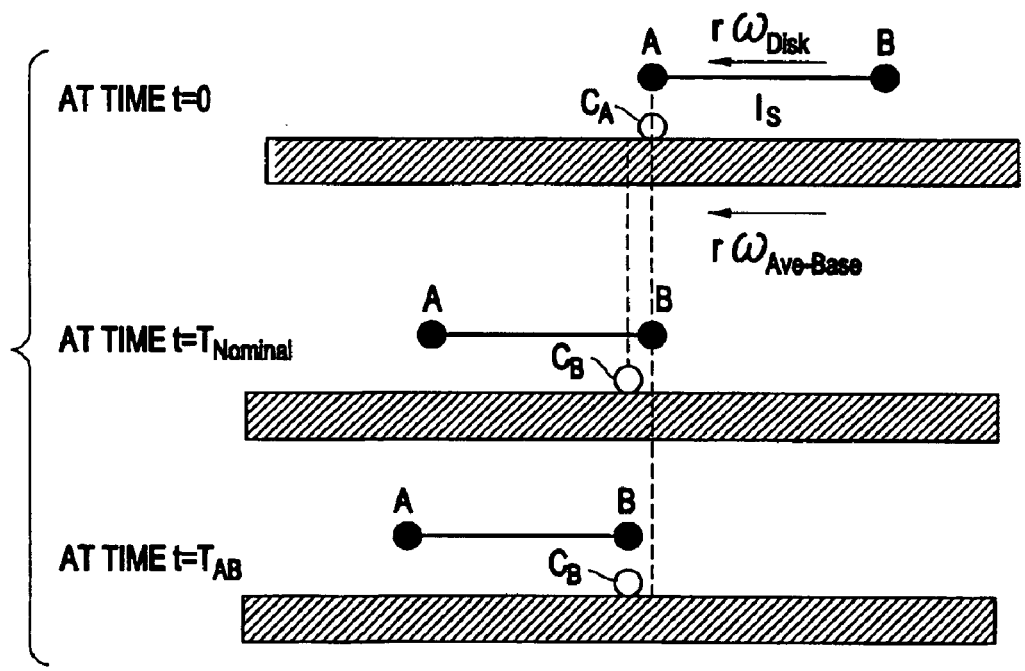

The relationships between these points are further illustrated in FIG. 6B. At time t=0, the head 106 sees point A which casts a projection $C_A$ on the base plate 105.

At time $t=T_{AB}$, point B is seen by the head with its shadow $C_B$. This happens because the head 106 moves along with the base plate 105. If it did not, then it would not see point B until $T_{Nominal}$.

Figure 6C:
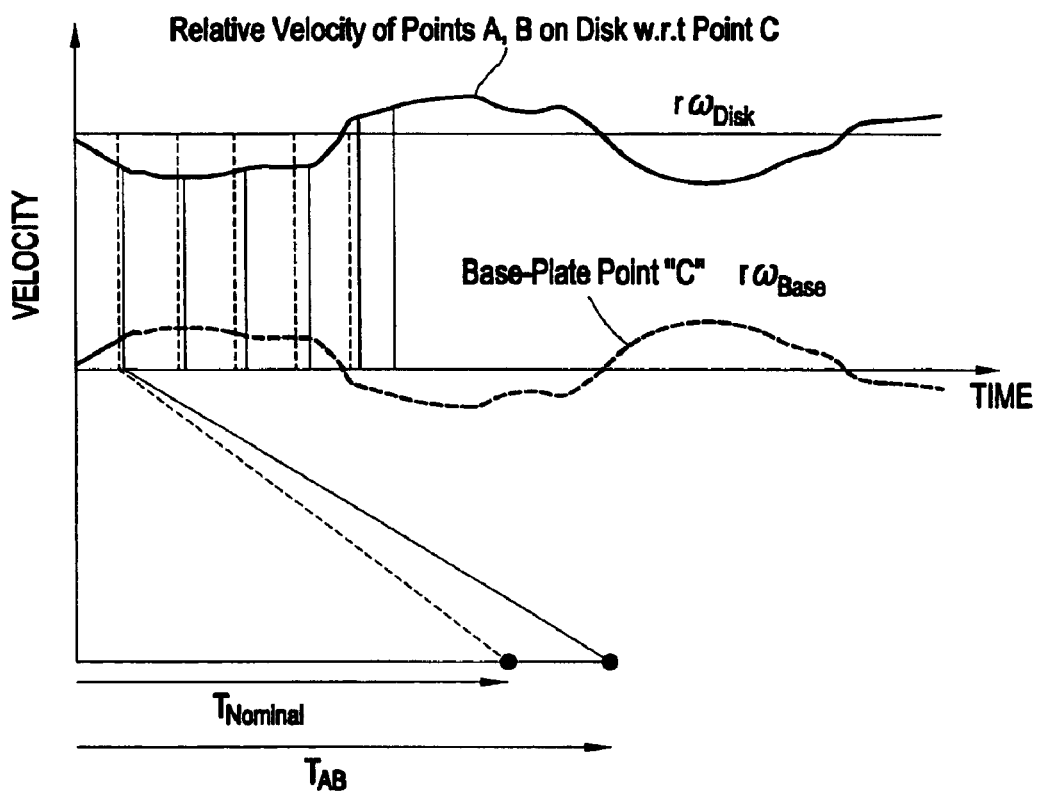

FIG. 6C displays the relative velocity of points A, B with respect to point C. The integration of the area under the combined velocity curve is the distance traveled or "L". $T_{AB}$ is the time needed for points A, B to pass by the head when the base plate 105 is rotating. If the base plate 105 is stationary, then it takes $T_{nominal}$ time. The difference between the nominal and actual times is the timing shift or bit jitter as represented below:

$$\text{Bit Jitter}=T_{AB}-T_{nominal}=T_{nominal}(\omega_{Ave\text{-}Base}/\omega_{Disk}).$$

If the disk 107 is spinning at constant speed (rpm) and if there are N reference bits which are equally spaced around the circumference of the disk 107, then the time duration between bits is: T(n)=60/(N*rpm). In this ideal case, the change in T(n) or bit jitter is strictly proportional to the velocity of the rotational vibration. It is noted that, in a typical ("real world") HDD, the spindle speed is not perfectly constant and the reference bits are not equally spaced. Therefore, their effects have to be taken into account. Due to the large inertia of the disks, spindle hub, bearings and spindle motor, the spindle speed varies slowly and it can be removed by a high-pass filter. The reference bits do not have to be equally spaced as along as the duration between bits are known for the quiescent case. This can be done by measuring the average T values without vibration.

The reference bits can be any designated transitions written in the data or servo area. They can be special bits used solely for measuring time intervals or existing transitions that are common to all sectors, as long as they fit the following characteristics.

First, there should be sufficient reference transitions to adequately sample the highest vibration frequency. Most computer chassis tend to have TMR producing resonance in the range of 100 to 1000 Hz. The storage industry trend is to produce disk drives that have shorter than 10 ms full seek time and less 5 ms ⅓ seek time. This characteristic trend implies that the random excitation frequency is expected to be not lower than 100 Hz.

On the highest frequency spectrum, a single track seek of 1 ms corresponds to 1 KHZ (and the strength of the seek pulse is not as severe as that of a full seek). Therefore, the random vibration excitation at any point on a computer frame is bound to be between 100 Hz to 1 KHZ, with the most likely events occurring around 200–800 Hz range due to ⅓ or shorter seek lengths. Thus, T(n) should be less than about 500 microseconds.

Secondly, the interval between reference transitions should be long enough to show the time shifts' effect of vibration. This depends on the resolution of the clock used in measuring the time interval. If the reference bits are closer together, then a higher frequency clock would be needed to discriminate a smaller time shift.

Figure 7A:
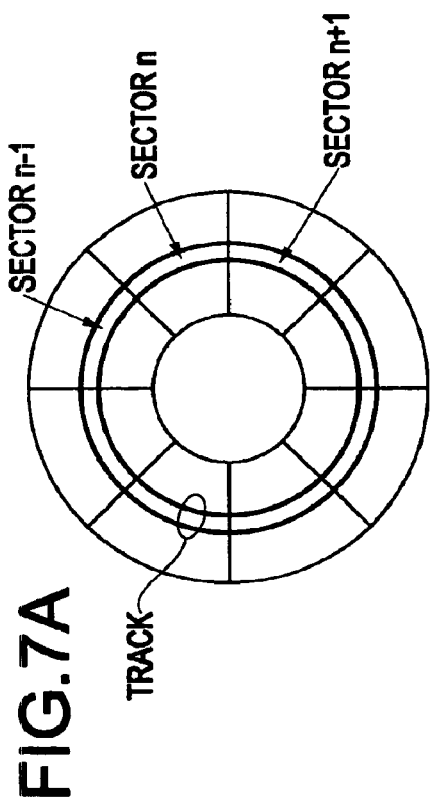
FIGS. 7A–7B illustrate track and sector organization.
Figure 7B:
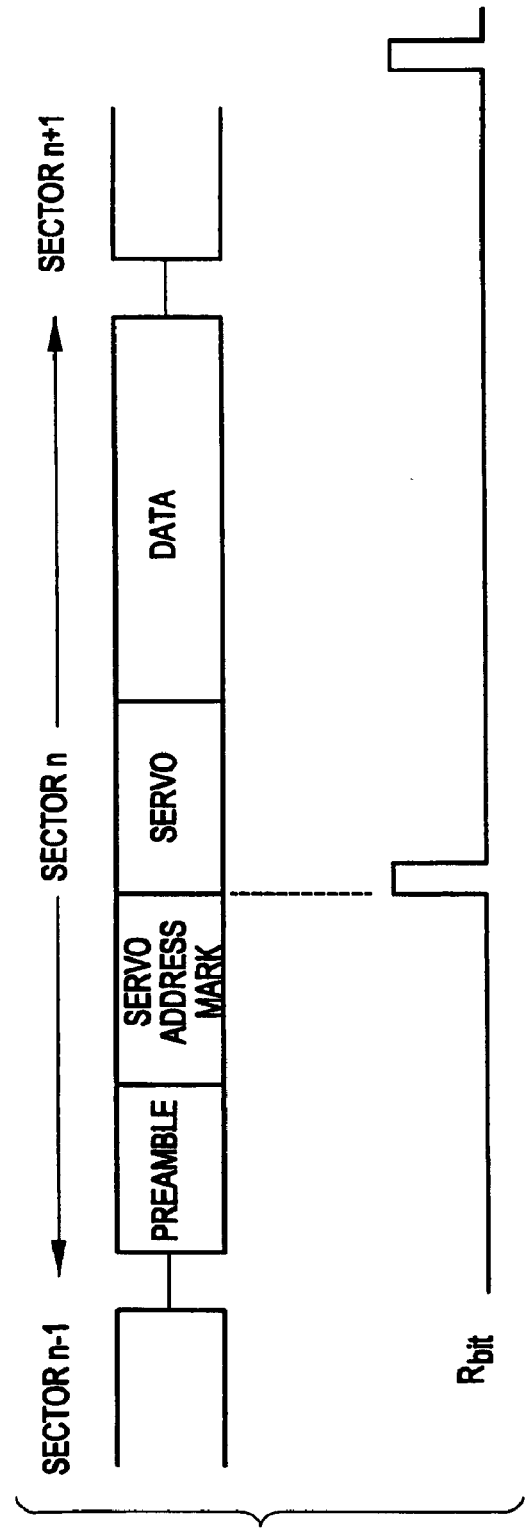

In experiments, the present inventors used the transition that signals the beginning of the servo field, called the Servo Address Mark (FIG. 7(b)) as the reference transition, Rbit. There is one Servo Address Mark per sector. Therefore, 66 reference transitions per revolution were provided, and the nominal time interval between sectors is T(n)=126 microseconds. A 125 MHZ clock was used to measure T(n). This provided 8 ns resolution.

Figure 8:
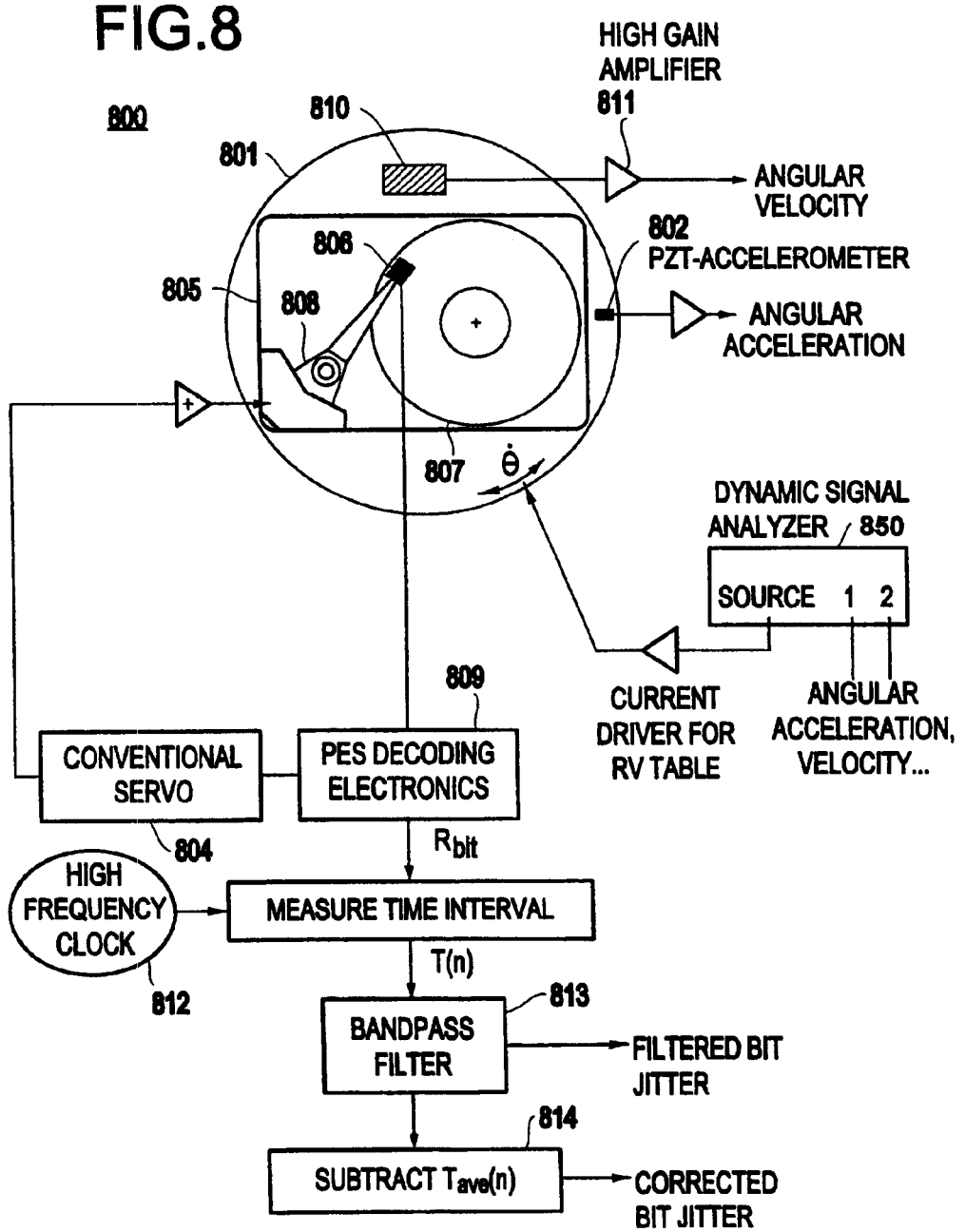
FIG. 8 illustrates an experimental setup to compare piezoelectric (PZT), electromotive force (EMF), and Bit Jitter (time shift)
Figure 10A:
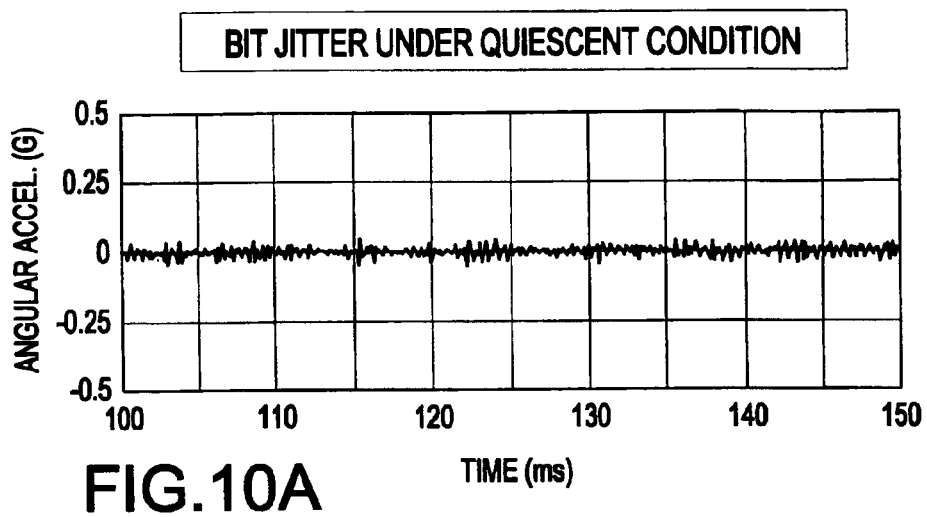
FIGS. 10A–10C illustrate PZT, EMF and filtered bit jitter data for a quiescent case.
Figure 10B:
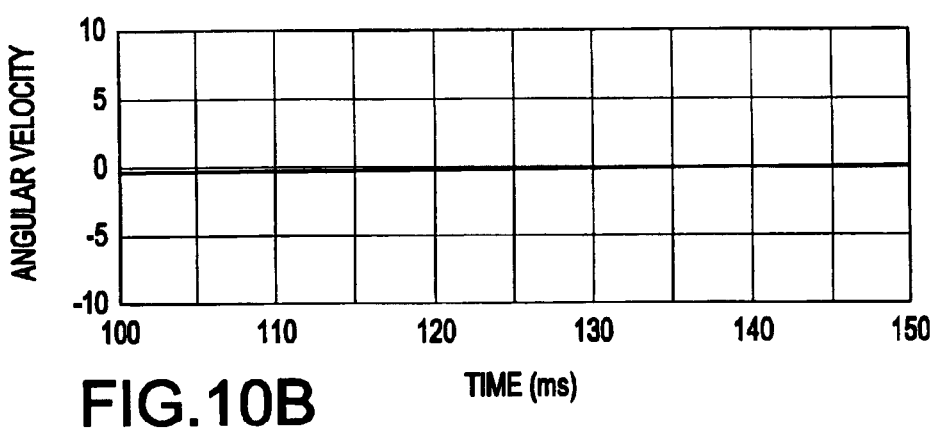
Figure 10C:
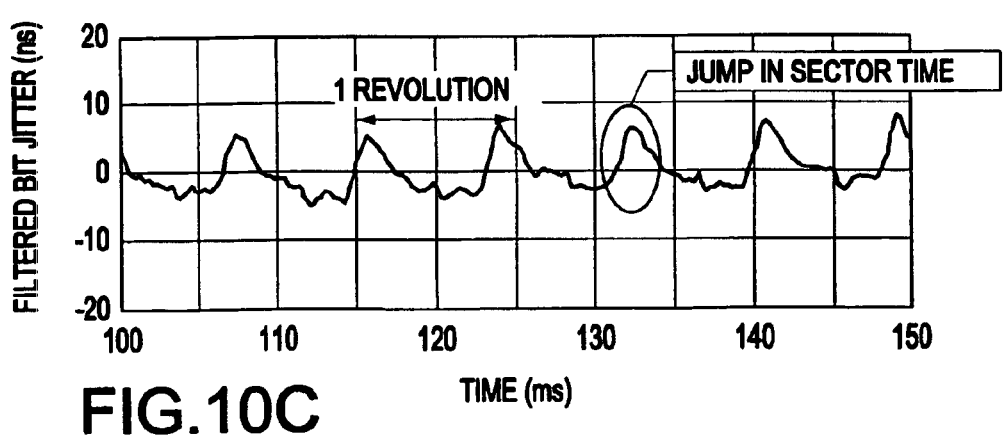

FIG. 8 shows a schematic of the laboratory setup of the configuration 800, which includes a circular platform 801 which constitutes the RV table which is driven by a current driver/table-actuator system (table-actuator not shown). FIG. 8 also illustrates a piezoelectric sensor 802, a servo 804, a base plate 805, a head 806, a disk 807, and an actuator 808 for the head 806.

The HDD under evaluation is mounted on the table 801 with its base-plate 805 facing up so that access to the drive electronics is made available. A head signal is extracted from the electronics and the required PES is decoded through a custom built circuit 809.

The onboard controller of the HDD is disabled for the experimental purposes and an external Digital Signal Processor (DSP) included in block 804 (e.g., conventional servo 804) is used as a controller. The external controller implements a conventional PID-like controller in the track-follow mode.

A back EMF sensor 810 is mounted on the table away from the center of rotation of the RV table 801 (center of the circle) and the generated voltage due to RV is amplified by a high gain (~1000) amplifier circuit 811. To set a reference for vibration sensing, the PZT accelerometer 802 preferably is a high quality PZT accelerometer.

A Dynamic Signal Analyzer (DSA) 850 excites the RV table 801 and records angular acceleration and velocity data.

T(n) is the elapsed time between the reference bits, Rbit. A simple way to measure T(n) is to use Rbit to start and stop a clock 812 (e.g., a high frequency clock) and T(n) is the accumulated clock count multiplied by the clock period.

For an 8 ns clock period, a 15-bit counter could be used which runs at a fairly high frequency. However, this could be hard to achieve and expensive for low-end HDD.

The counter could be significantly smaller if it starts counting after a fixed delay from Rbit (e.g., as shown in a counter 912B of FIG. 9). This fixed delay could be another existing signal, or it could be generated by another counter running at a slower clock but synchronized to the high frequency clock. With the proper selection of clock frequencies, the two counters would still be smaller than a single 15-bit counter.

Another possibility is to let the counter "wrap around" back to 0 after its highest count, taking advantage of the modulo math feature of the binary counter (e.g., as shown by counter 912A in FIG. 9). The "wrap-around" counter represents a counter that resets itself upon reaching a predetermined threshold.

In this case, the counter 912A should be long enough to contain two times the range of clock counts equivalent to a difference in time shifts of the highest vibration level and quiescent. Depending on the combination of T(n), clock frequency and counter length, the number of times the counter wraps around might or might not be important. Only the last couple of bits are primarily important in the method of the present invention.

Hence, if the time interval is substantially wide between the reference bits, but the time shift is a small number, then a straightforward way to detect the variation is to have a large-word length counter which counts starts counting at a certain reference bit and keeps counting to the very end (e.g., to the a next reference bit), and then taking a difference between the two relatively large numbers. However, putting a large word length counter may not be practical (e.g., a 25-bit counter or the like).

Thus, for example, if one knows that the bit variation is always going to be within a certain amount (e.g., ±50 bits, or ±100 bits, etc.), then a limited word length counter could be provided which keeps counting up and then goes to zero, and so forth, so long as the last part of the cycle is captured where the next reference bit will happen. This is distinguished from the sole counter blindly counting up and up and taking a difference between a start and end of the counter. Hence, such a counter could count to 256, go to zero, count up again to 256, go to zero, etc., until the next reference bit is found. Thus, since it is known that the bit variation is going to be within a certain range, such a small counter can always find the true variation since it will be forward (or backward) from the count by no more than 50 bits, or 100 bits, etc.

Thus, again, in such a small counter, if the minimum and maximum count time (e.g., ±50, ±100, etc.) of the next reference bit are known, then the counter can reset itself until some where near the beginning of the range and then start counting threat from 0 and will keep counting up until it captures the maximum window which is needed. Hence, in this embodiment of the counter, some prior knowledge is preferably known of the maximum vibration range which will be encountered. Thus, the counter may go through several iterations of counting to 256, and resetting itself, and then it will "really" start counting for the true variation starting at or near the minimum value of the range.

Referring to FIG. 8 again, T(n) is further processed by a 40–1000 Hz bandpass filter 813 to remove the jitters due to the spindle speed variation and any high frequency noise. In the last step, non-uniform time spacing of T(n) is removed by subtracting $T_{ave}(n)$.

"n" is the index number which happens to be the same as the sector number in this case. $T_{ave}(n)$ is the average filtered sector time of sector "n" in quiescent mode. $T_{ave}(n)$ is similar to the Repeatable Run Out (RRO) concept. This last step significantly enhances the resolution of the Bitter Jitter method when T(n) is not uniform or when a low clock frequency is used.

$T_{ave}$ could be measured during manufacturing, at power-on or when the HDD is idle. The number of data points needed depends on the quality of the servo writing process and the desired vibration sensitivity.

For example, if the sectors are radially aligned then only "n" values are needed per disk surface. If the sectors are fairly equally spaced except for the last sector, then only 1 correction value is needed per track. Hence, there are many ways to minimize the size of the correction values (beside the normal tradeoffs between the number of bits/value).

Figure 15A:
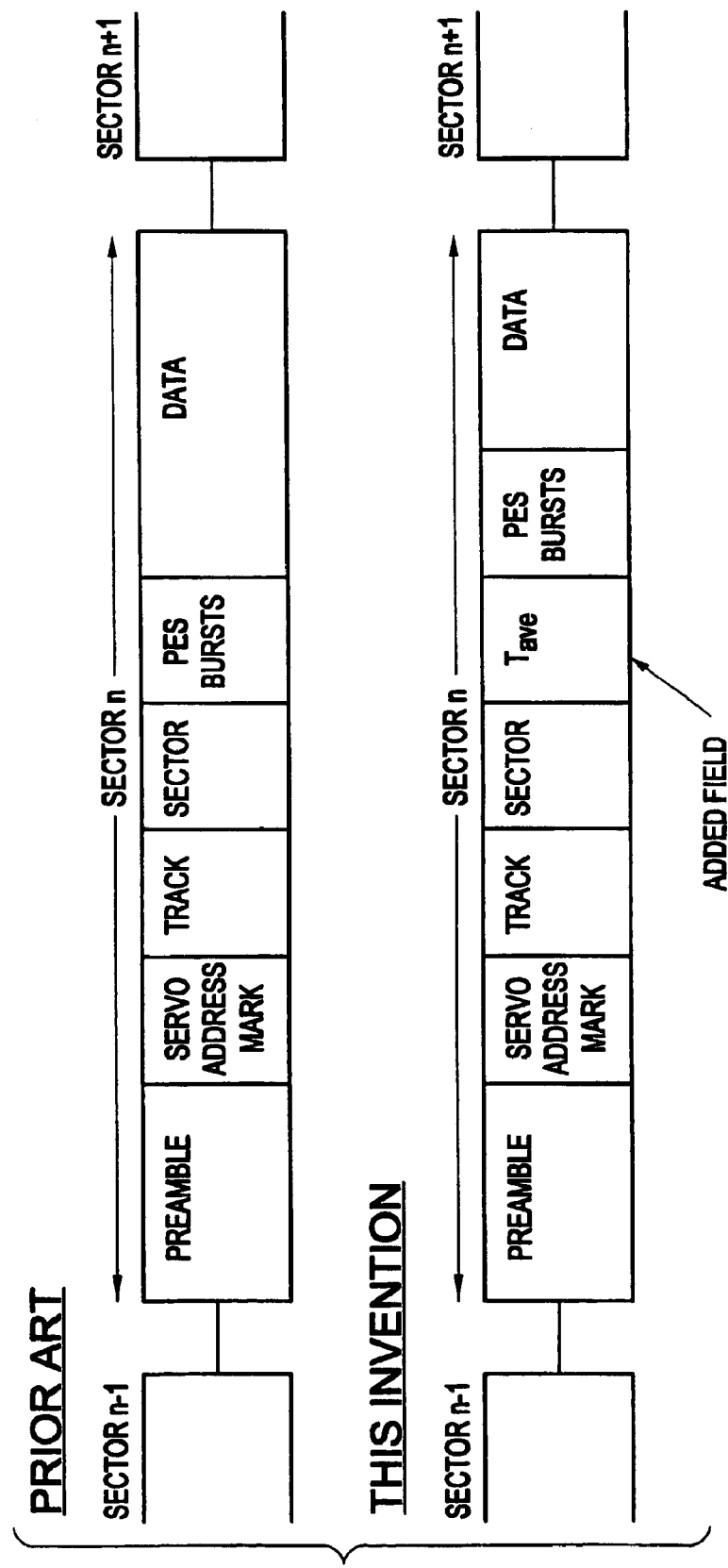
FIGS. 15A–15B illustrate a new field in servo area to store average bit jitter.

$T_{ave}$ could be stored in a separate look-up-table or in a reserved field added to the servo area, as illustrated in the data sector of FIG. 15A. The position of the added field relative to other fields in the sector is not important.

Also, the bit format of $T_{ave}$ could be chosen to minimize its size. Only the relative differences between the nominal value and the measured values are saved; each bit corresponds to a full or a fraction of a clock count. For example, in the experiment by the present inventors, if each bit is assumed to represent ⅛ of a clock count, or 1 ns, then less than 4 bits are needed to store $T_{ave}$.

Figure 15B:
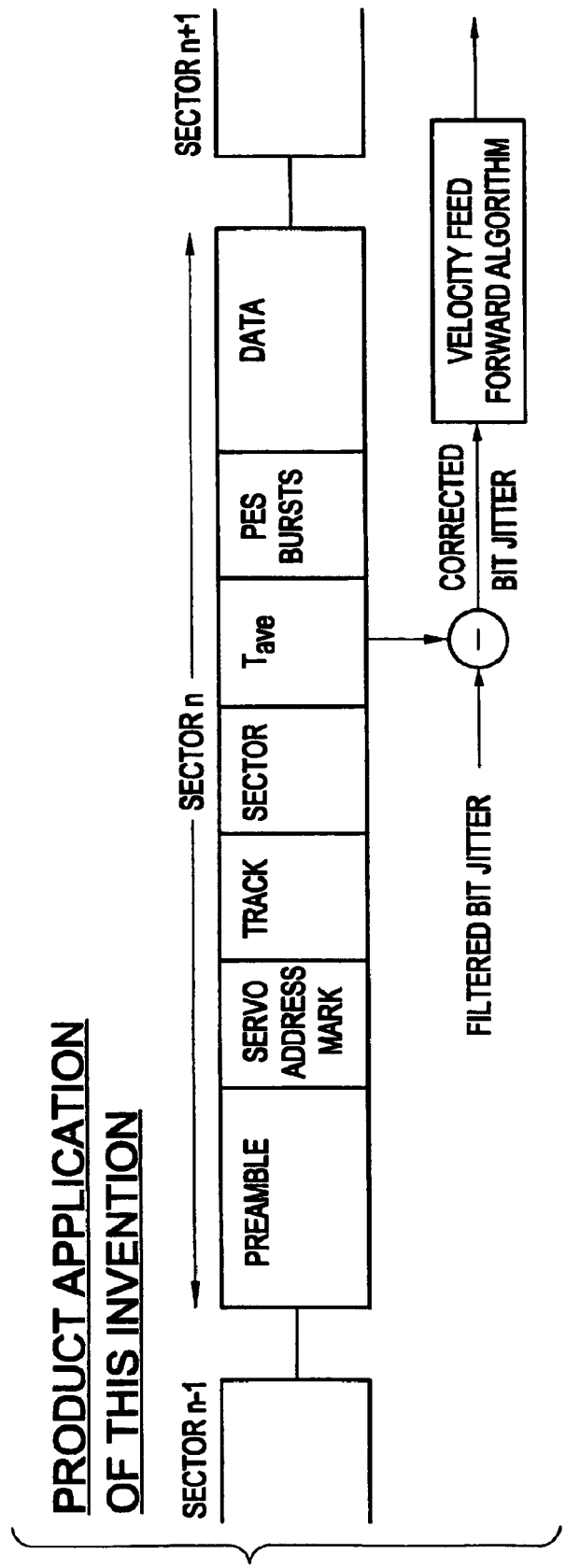

Thus, FIGS. 15A and 15B illustrates how the detailed information of the prior art and the invention are stored, with the clear differences between the two structures being evident.

FIGS. 10A–10C and 11A–11C compare the outputs of the PZT sensor, EMF sensor and Filtered Bit Jitters (FBJ) for the quiescent and 40 rad/s² sinusoidal rotational vibration, respectively. FBJ is fairly large for the quiescent case which is considerably affected by the low resolution of the clock used by the present inventors. The pronounced peaks happen once per revolution, and they are caused by the lengthening of T(n) of the last sector that was servo written on this track. The end of this last sector does not align with the beginning of the starting sector of the servo writing process.

Figure 11A:
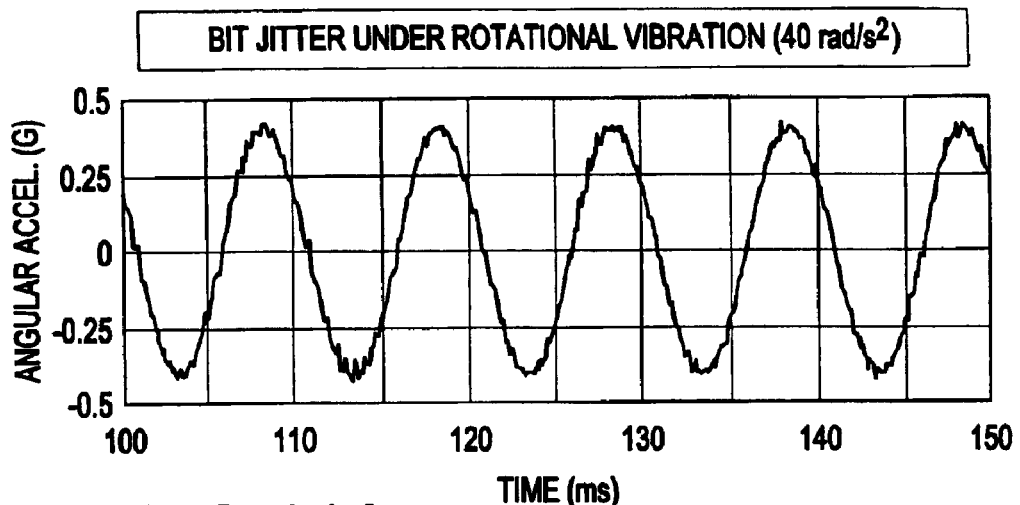
FIGS. 11A–11C illustrate PZT, EMF and filtered bit jitter data for 40 rad/s$^2$ excitation.
Figure 11B:
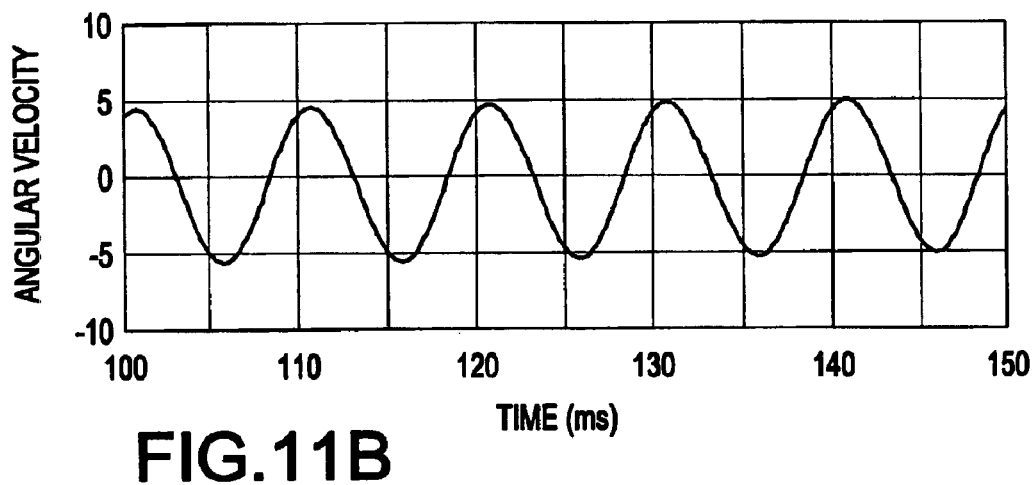
Figure 11C:
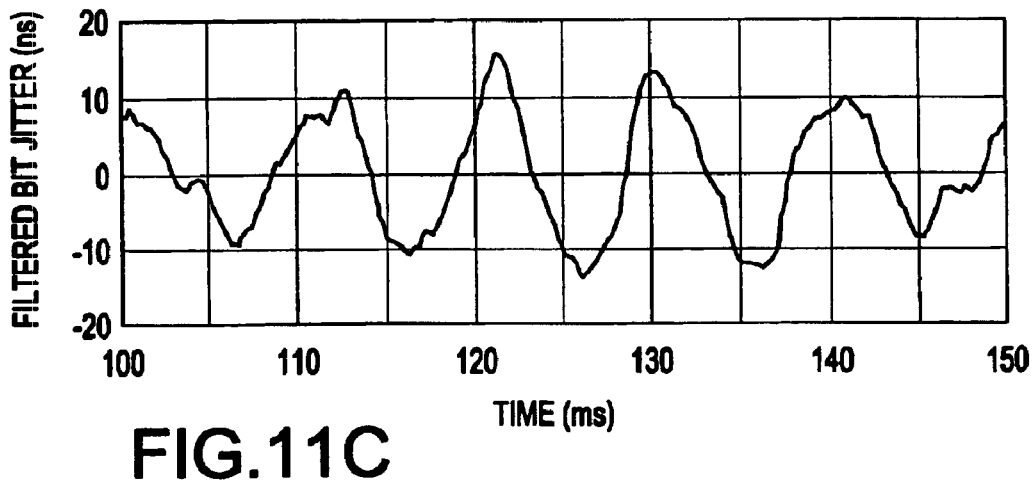

Thus, without vibration, FBJ indicates the quality of the servo writing process, with respect to uniformity and closure. At 40 rad/s², FBJ compares reasonably with the angular velocity signal which is the derivative of the acceleration output. The peaks lineup but they have some modulation in amplitude. Hence, FIG. 11C illustrates that a separate sensor is not required.

Figure 12A:
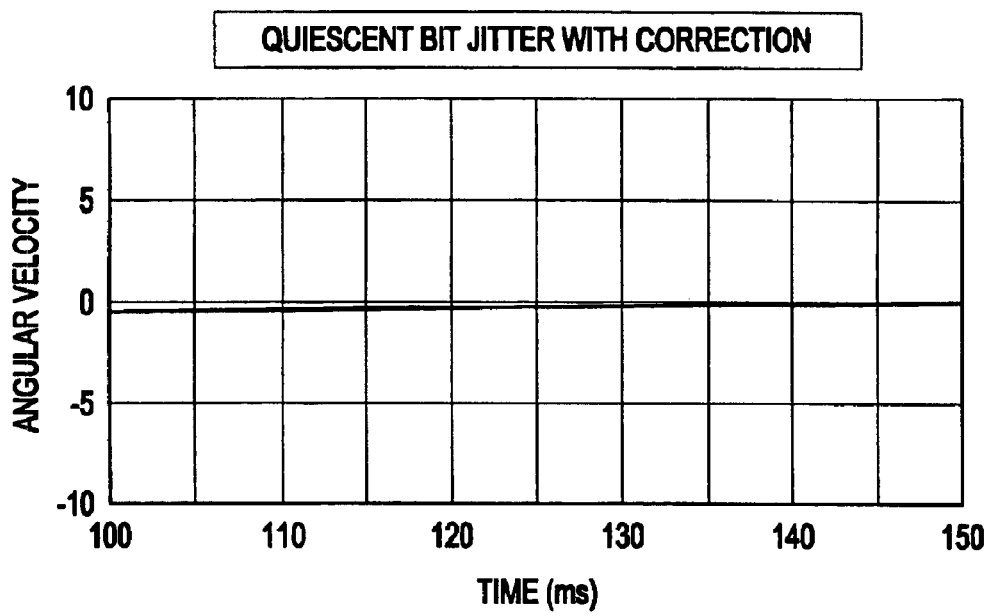
FIGS. 12A–12B illustrate PZT, EMF and corrected bit jitter data for the quiescent case.
Figure 12B:
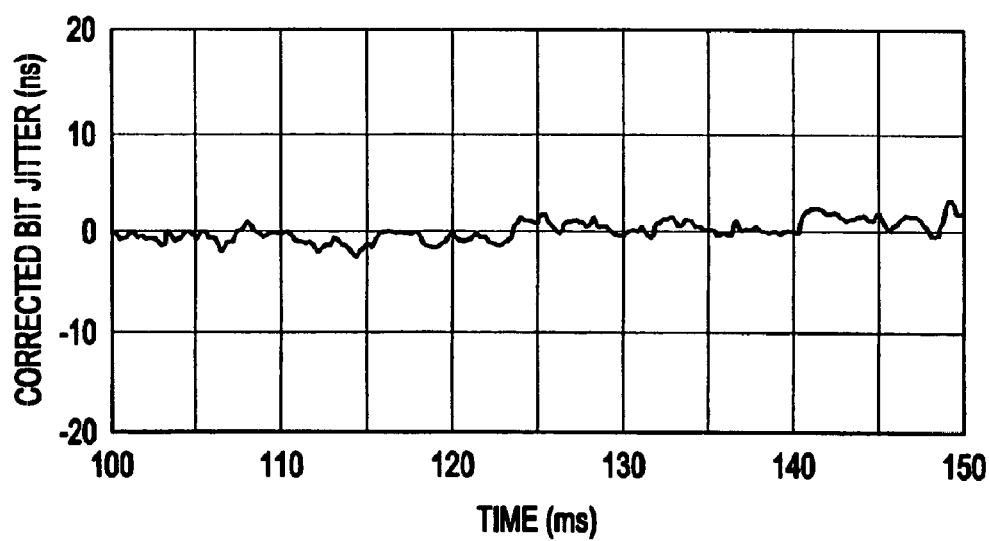
Figure 13A:
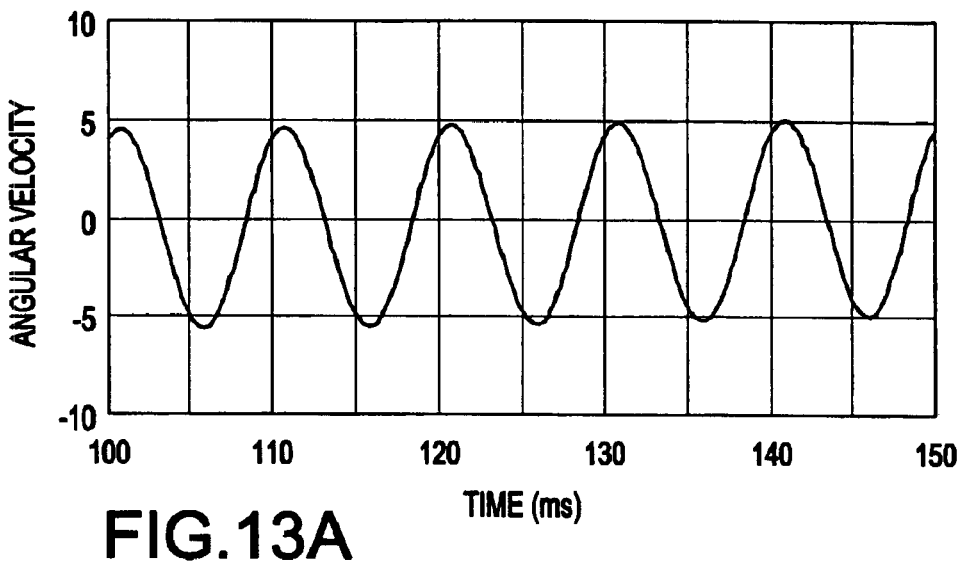
FIGS. 13A–13B illustrate PZT, EMF and corrected bit jitter data for 40 rad/s$^2$ excitation.
Figure 13B:
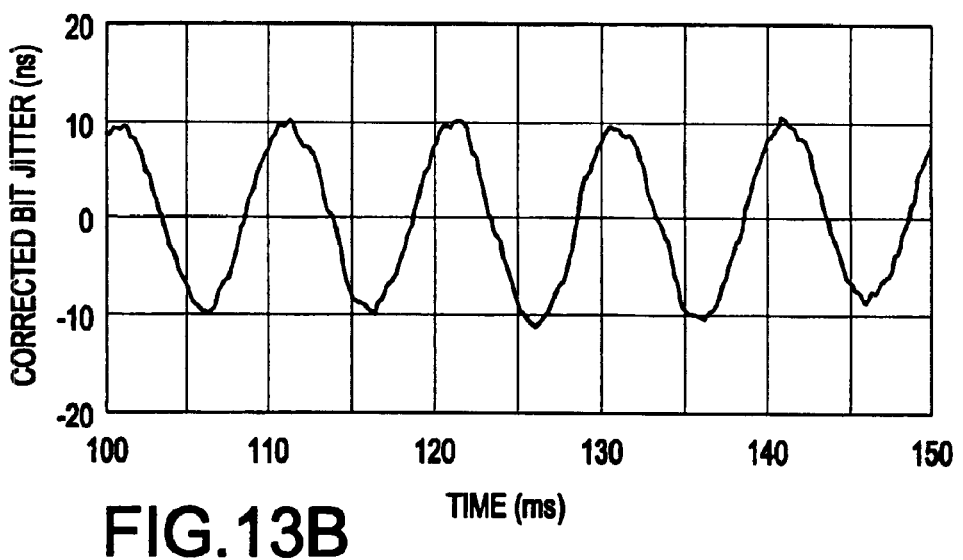

FIGS. 12A–12B and 13A–13B compare the angular Velocity signal with the corrected bit jitters (CBJ) for the quiescent and 40 rad/s2 rotational vibration, respectively. That is, the $T_{ave}$ has been removed, as shown in FIGS. 12B and 13B.

The quiescent values are now much smaller and much more like random noise. The CBJ at 40 rad/s$^2$ correlates very well with the angular velocity signal. The amplitude modulation is now very small. This demonstrates that the angular vibration can be sensed by discriminating the time shift of the reference bits.

Figure 14:
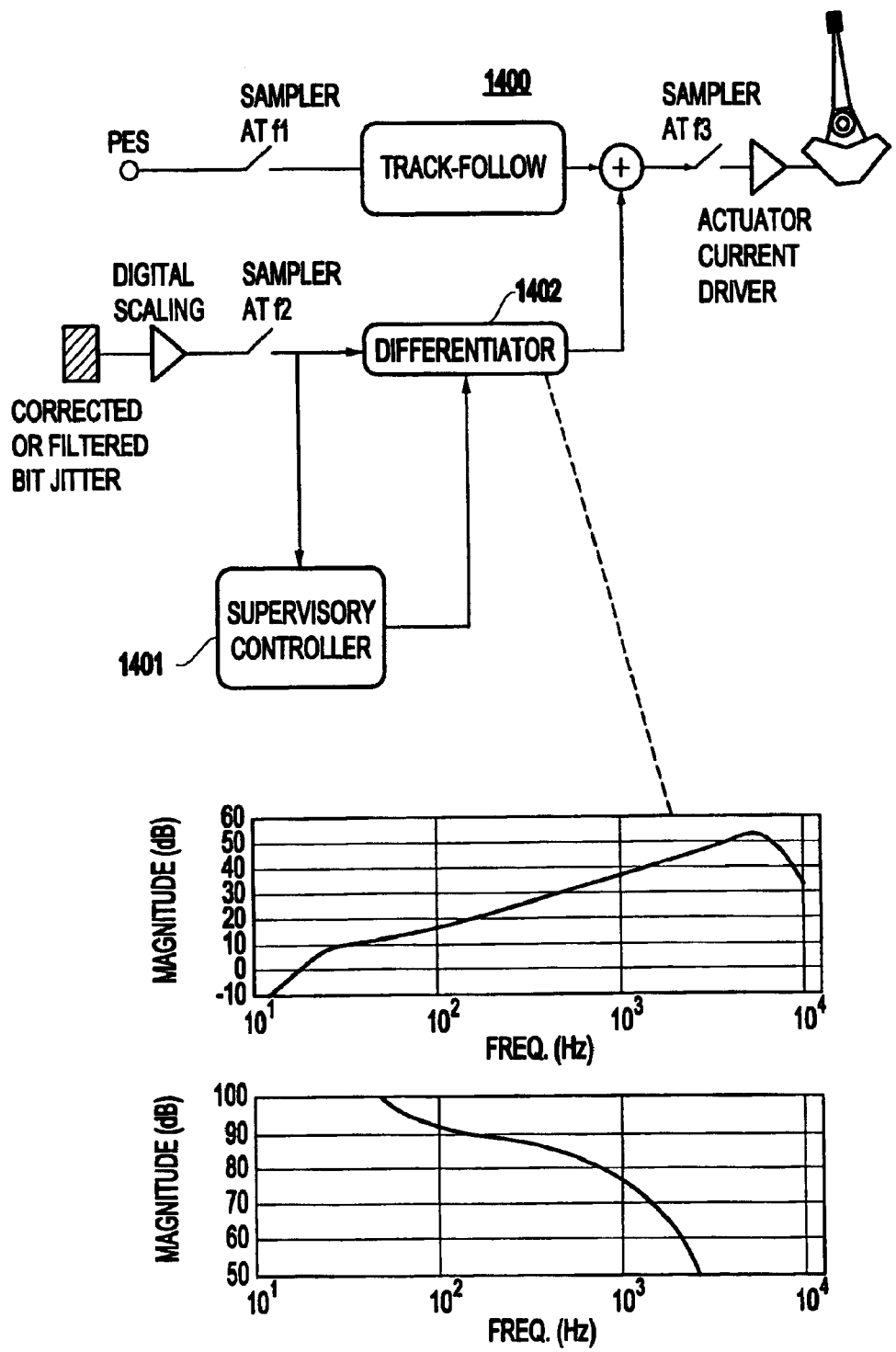
FIG. 14 illustrates a bit-jitter feed-forward servo loop.

Turning now to FIG. 14, a conventional servo system 1400 is shown with corrected bit jitter according to the present invention. Thus, FIG. 14 illustrates how the corrected bit jitter can be used in a servo mode. Indeed, the bit jitter signal can be used just like the signal coming out of an EMF velocity sensor (e.g., see FIG. 14). The sampling frequencies F1, F2 and F3 can be chosen to maximize the system performance.

With an appropriate velocity based feed-forward controller (e.g., as disclosed, for example, in U.S. patent application Ser. No. 10/153,684, filed concurrently herewith, and having, incorporated herein by reference), the TMR disturbance due to random rotational vibration can be rejected. The feed-forward loop could be active all the times, or it could be turned on when a certain vibration level (bit jitters) is detected to minimize noise. For example, the supervisory controller 1401 of FIG. 14 could issue a switch signal when the vibration level is significant. Hence, when the bit jitter is low, no bit jitter is input.

The digital scaling and differentiation could be performed in two steps or combined into one operation. The scaling factor could be measured during manufacturing or in-situ. During manufacturing, the peak amplitude of the bit jitter is compared with a reference value for a known RV excitation. Based on this information, the scaling factor can be determined.

Another method is for a known RV, the scaling factor is adjusted until optimal cancellation is achieved as measured by the sigma of the PES. One in-situ method is to change the track following controller to have a lower crossover frequency, then correlate the PES amplitude (or sigma) with that of the Bit Jitter in the presence of RV. The amplitude of PES reflects the amplitude of the RV which in turn can be used to calibrate the Bit Jitter gain. All of the calibration methods above can be done in micro code.

In computer system with a single HDD, the RV is self-induced. In this case, the performance degradation is not in the steady state TMR, but from disturbances associated with seek reaction torque. The Bit Jitter signal can be used to sense the RV of the HDD due to the mount resonance and improve the seek-settle times.

Returning to FIG. 15B, the $T_{ave}$ is used by being input to a difference circuit along with the filtered bit jitter to get the corrected bit jitter. The corrected bit jitter in turn is input to the velocity feed forward algorithm, and the output of the algorithm is input to a differentiator 1402 (or the like) of FIG. 14.

Figure 16A:
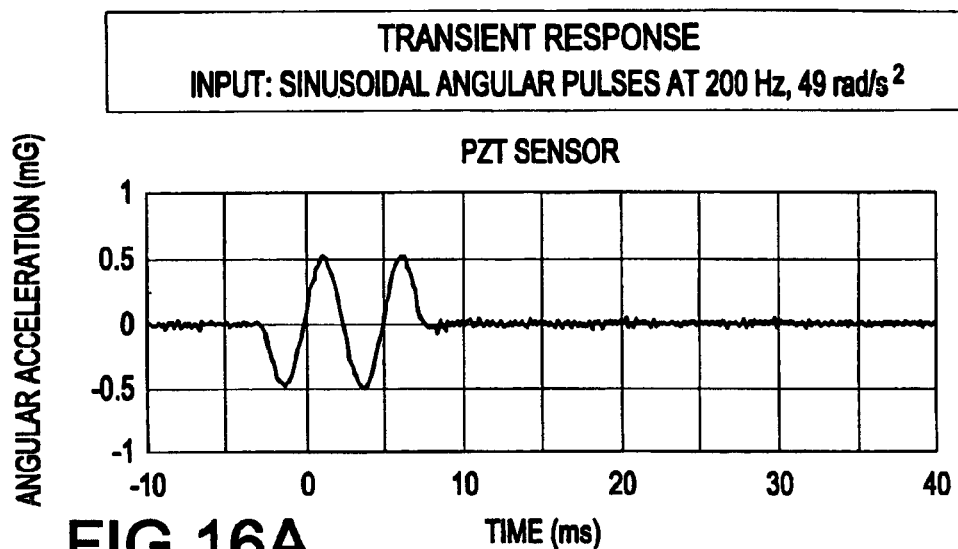
FIGS. 16A–16C illustrate bit-jitter transient response.
Figure 16B:
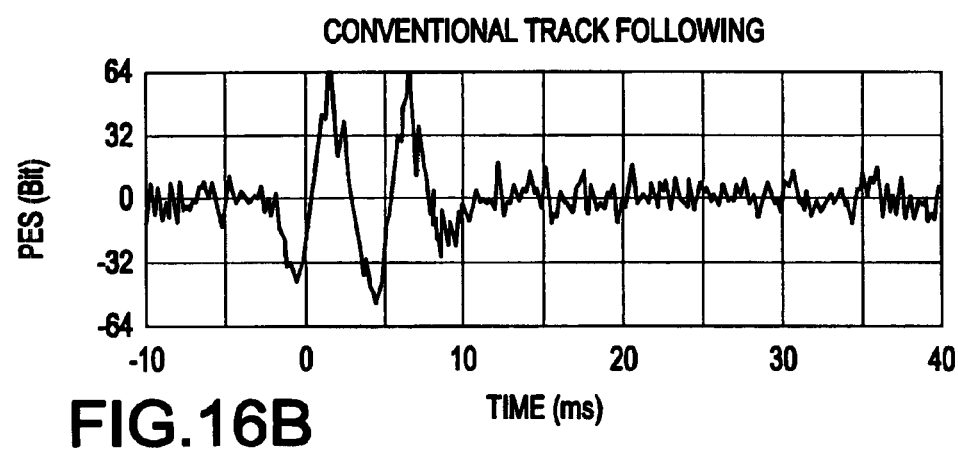
Figure 16C:
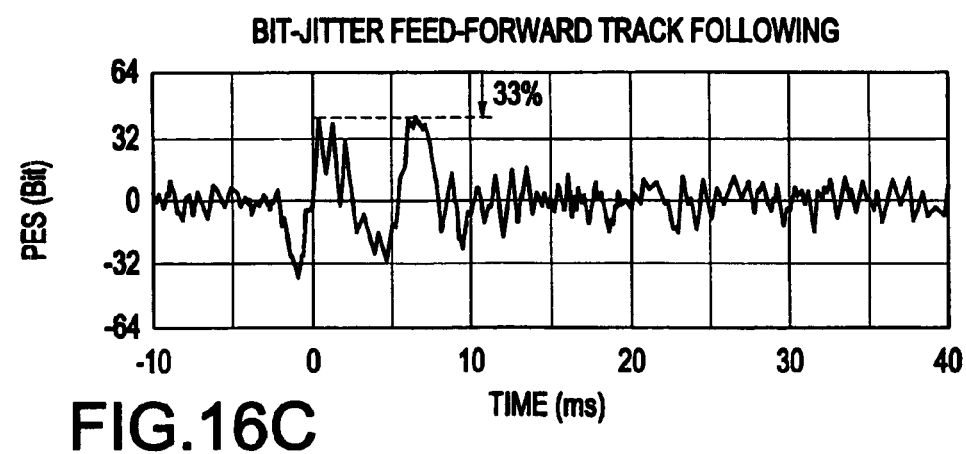

FIGS. 16A–16C show the transient response of the bit-jitter method even with a relatively low-level signal applied. That is, the applied rotational vibration pulses at 49 rad/s$^2$, 200 Hz, are detected by the bitter-jitter and the PZT sensor 802 and are reflected in the PES of the conventional servo track following controller 804.

FIG. 16B shows the conventional track following, whereas FIG. 16C illustrates the bit-jitter feed-forward track following.

As shown, in FIG. 16C, the error is reduced and settles into a track sooner than in the conventional structure. Indeed, the error rate is reduced, and the head comes back into its required track 2–3 ms sooner (e.g., without the extra "overshoot" shown in FIG. 16B of the conventional structure).

Thus, in FIGS. 16A–16C, two sinusoidal pulses (e.g., simulating the base plate motion) are applied as shown. As shown, with the inclusion of the CBJ in the track following loop, the head movement is reduced by more than 30 percent. Such a reduction is made possible without an external sensor or the like. In this implementation, the bit-jitter feed-forward loop is only activated when the rotational disturbance is larger than a preset threshold, as shown in FIG. 17.

Figure 17:
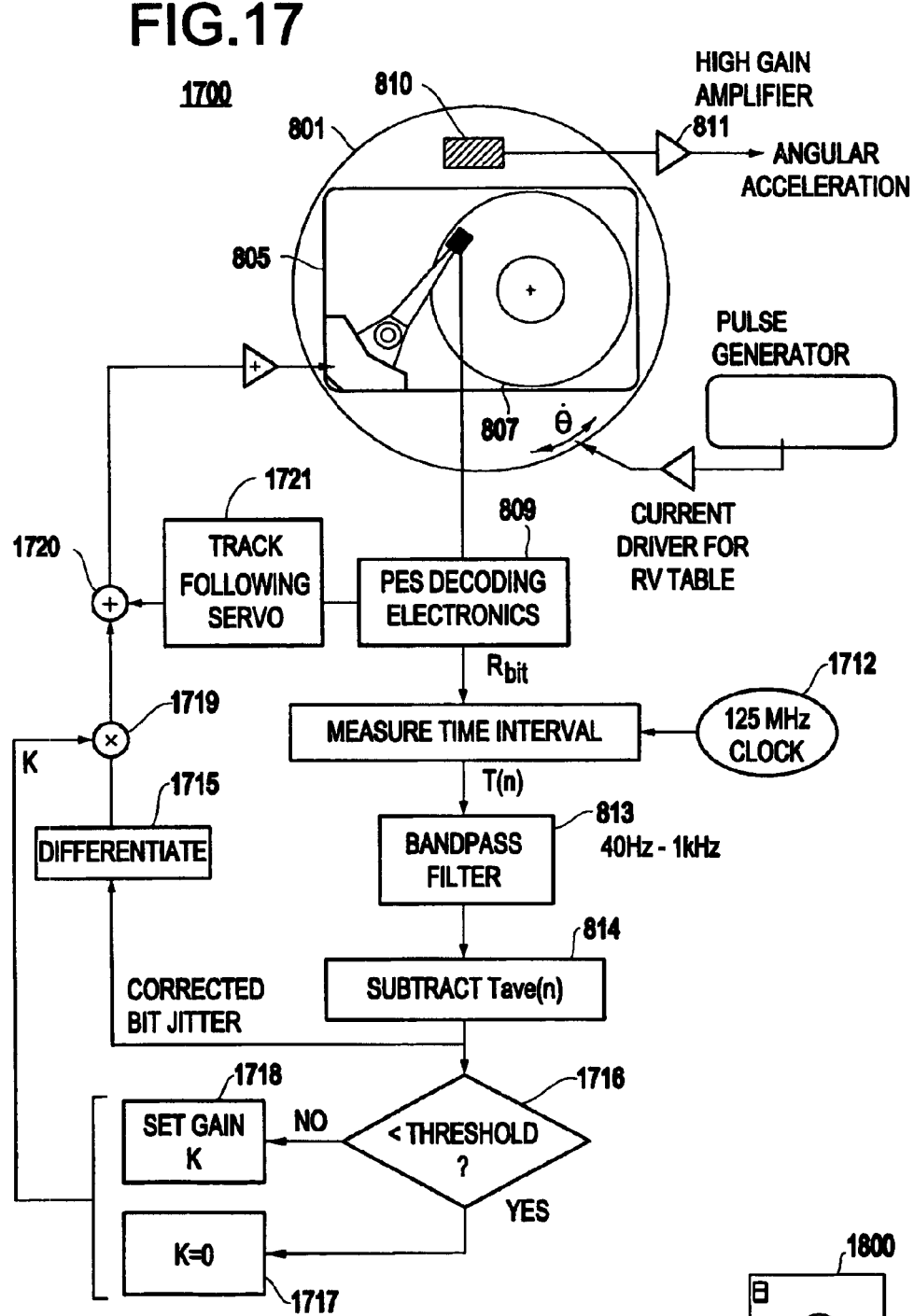
FIG. 17 illustrates an experimental setup of the bit-jitter transient study.
Figure 18:
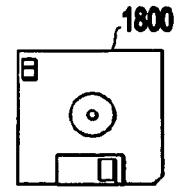
FIG. 18 illustrates a signal bearing medium 1800 (e.g., storage medium) for storing steps of a program of a method according to the present invention.

That is, FIG. 17 shows a structure 1700 which represents an implementation of the algorithm, and is an extension of the measurement setup of FIG. 8. As shown, the structure 1700 includes many similar components as that of FIG. 8. Structure 1700 further includes a clock track following servo 1720.

However, in contrast to FIG. 8, in FIG. 17 the servo augmentation is performed through the conventional servo loop in which the reference bit is taken, the time interval is measured, the signal is passed through the bandpass filter 813, and the average value is subtracted (e.g., in a subtractor circuit or the like 814) and the corrected bit jitter is sent to a differentiating unit 1715.

If the time shift (jitter) level is relatively low (e.g., lower than the threshold in box 1716), then the gain is set to 0 in the gain circuit (e.g., box 1717 in FIG. 17) and there is no feedforward employed. If the value is greater than the threshold, then the gain is set to K in the gain circuit (e.g., as shown in box 1718 in FIG. 17) and the signal is sent to a multiplier circuit 1719 to be multiplied by the differentiated corrected bit jitter signal. The output of the multiplier circuit 1719 is sent to summing circuit 1720 which sums the output with an output of a track following servo 1721.

It is noted that the quality of the Bit Jitters signal depends on the quality of the input clock 1712 and its frequency. This clock should be stable, low jitters and as high in frequency as possible. Higher frequency clock allows the sensing of lower level of vibration. But lower level of vibration does not effect the TMR too much. Thus, there are tradeoffs between clock frequency, spacing between reference bits and sensitivity which determine the added cost and complexity of the design.

The Bit Jitters method scales with future generation of HDDs. Higher TPI will have higher number of sectors. This increases the sampling rate and reduces the phase delay of the jitters information. On the other hand, the reference bits will be closer and a higher frequency clock will be needed to maintain the same vibration sensitivity. For low sector count HDD, it is desirable to have multiple reference bits per sector to maintain reasonable phase delay. On the contrary, for very high sector count HDD, the reference bits could occur every "k" sectors, where "k" is chosen so that the time intervals between reference bits are long enough for the time shift to be properly detected.

In addition to the hardware/software environment described above, a different aspect of the invention includes a computer-implemented method for Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating a CPU and hardware above, to perform the method of the invention.

This signal-bearing media may include, for example, a RAM contained within the CPU, as represented by the fast-access storage for example. Alternatively, the instructions may be contained in another signal-bearing media, such as a magnetic data storage diskette 1800 (FIG. 18), directly or indirectly accessible by the CPU.

Whether contained in the diskette 1800, the computer/CPU, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of several preferred embodiments, those skilled in the art will recognize that the invention can be practiced with modification within the spirit and scope of the appended claims.

It is noted that the invention can be advantageously used in a conventional read-write head system as discussed above.

However, the invention has many other applications such as in a detector unit in general. For example, the invention could be used in a load/unload ramp on the edge of the disk. In the ramp, some form of sensor could be embedded which acts on capacitance or some markings on the diskette. Thus, a detector which is appropriately positioned to sense a moving (rotating) target could be advantageously provided.

What is claimed is:

1. A method of sensing a rotational vibration of a hard disk drive including a rotating disk therein, comprising:

analyzing a time shift of reference bits spread on the rotating disk received in said hard disk drive;

utilizing a bandpass filter to process a signal representing said time shift;

wherein said bandpass filter comprises a highpass filter.

2. The method of claim 1, wherein said method is implemented solely in digital electronics.

3. The method of claim 1, wherein said method is implemented in software in combination with a very large scale integrated (VLSI) structure.

4. A method of sensing a rotational vibration of a hard disk drive including a rotating disk therein, comprising:

analyzing a time shift of reference bits spread on the rotating disk received in said hard disk drive;

wherein sensitivity of the method is minimized against linear vibration and treats an output signal as resulting from rotational vibration excitation of the disk drive.

5. A method of sensing a rotational vibration of a hard disk drive including a rotating disk therein, comprising:

analyzing a time shift of reference bits spread on the rotating disk received in said hard disk drive;

further comprising:

removing an average or repeatable time between reference bits.

6. A method of sensing a rotational vibration of a hard disk drive including a rotating disk therein, comprising:

analyzing a time shift of reference bits spread on the rotating disk received in said hard disk drive;

wherein said analyzing observes only at a change in time interval between reference bits regardless of an absolute length of time.

7. The method of claim 6, wherein the time shift between reference bits is chosen to maximize resolution.

8. The method of claim 7, wherein one reference bit is sampled every predetermined "k" sectors for a disk drive with a predetermined high sector count, such that there is sufficient time for said rotational vibration to establish a predetermined significant change.

9. The method of claim 6, wherein multiple ones of the reference bits are provided per sector for a disk drive with a predetermined low sector count.

10. A method of sensing a rotational vibration of a hard disk drive including a rotating disk therein, comprising:

analyzing a time shift of reference bits spread on the rotating disk received in said hard disk drive;

further comprising:

measuring, based on said analyzing, a quality of a servo writer, with regard to uniformity of sectors and closure of a last written sector.

11. A system for sensing a rotational vibration of a disk drive, said disk drive including a rotating disk and said rotating disk including a plurality of reference bits across a surface thereof, comprising:

a detector for detecting said reference bits across a pattern on said disk;

an analyzer for analyzing a time interval between adjacent ones of said reference bits;

a bandpass filter for processing a signal representing said time shift; and, wherein said bandpass filter comprises a highpass filter.

12. The system of claim 11, wherein said system is implemented solely in digital electronics.

13. The system of claim 11, wherein said system is implemented in software in combination with a very large scale integrated (VLSI) structure.

14. A method of sensing a rotational vibration of a disk drive, said disk drive including a rotating disk and said disk including a plurality of reference bits across a surface thereof, comprising:

detecting said reference bits across a pattern on said rotating disk;

analyzing a time interval between adjacent ones of said reference bits; and inserting an additional reference bit between adjacent ones of said reference bits, to create a finer resolution.

* * * * *